US008557382B2

(12) United States Patent
Oxley et al.

(10) Patent No.: US 8,557,382 B2
(45) Date of Patent: Oct. 15, 2013

(54) LAYER BY LAYER MODIFICATION OF MICROCAPSULES WITH INORGANIC MATERIALS

(75) Inventors: James D Oxley, San Antonio, TX (US); Jenny J. Finkbiner, Helotes, TX (US); Darren E. Barlow, Floresville, TX (US)

(73) Assignee: Southwest Research Institute, San Antonio, TX (US)

( * ) Notice: Subject to any disclaimer, the term of this patent is extended or adjusted under 35 U.S.C. 154(b) by 304 days.

(21) Appl. No.: 12/468,571

(22) Filed: May 19, 2009

(65) Prior Publication Data

US 2010/0297446 A1    Nov. 25, 2010

(51) Int. Cl.
*C25D 9/00*    (2006.01)
*A61K 9/00*    (2006.01)

(52) U.S. Cl.
USPC .................. 428/402.2; 428/402.24; 428/403; 424/490; 424/489; 424/429; 205/170

(58) Field of Classification Search
USPC ........... 424/429, 490, 408, 489, 463; 264/4.1; 428/402.2; 514/2, 169; 525/398, 452, 525/453, 242
See application file for complete search history.

(56) References Cited

U.S. PATENT DOCUMENTS

| | | | |
|---|---|---|---|
| 5,716,709 A * | 2/1998 | Ferguson et al. | 428/420 |
| 6,969,530 B1 * | 11/2005 | Curtis et al. | 424/489 |
| 7,101,575 B2 * | 9/2006 | Donath et al. | 424/489 |
| 7,329,415 B2 * | 2/2008 | Lally et al. | 424/429 |
| 2003/0027011 A1 * | 2/2003 | Kotov et al. | 428/594 |
| 2004/0096515 A1 * | 5/2004 | Bausch et al. | 424/490 |

OTHER PUBLICATIONS

Kostarelos, et al., "Physical Conjugation of (Tri-) Block Copolymers to Liposomes toward the Construction of Sterically Stabilized Vesicle Systems," Langmuir, 1999, 15 (2), pp. 369-376.
Lei, et al, "Lipid Bilayer Vesicle Fusion: Intermediates Captured by High-Speed Microfluorescence Spectroscopy," Biophysical Journal, vol. 85, Issue 3, 1585-1599, Sep. 1, 2003.
Zhang, et al., "How to Stabilize Phospholipid Liposomes (Using Nanoparticles)," Nano Letters, 2006, vol. 6, No. 4, pp. 694-698.
Ringsdorf, et al., "Molecular Architecture and Functions of Polymeric Oriented Systems: Models for the Study of Organization, Surface Recognition, and Dynamics of Biomembranes," Angewandte Chemie International Edition in English, vol. 27 Issue 1, pp. 113-158 (1988).
Borden, et al., "Oxygen Permeability of Fully Lipid Monolayers," J. Phys. Chem. B 2004, 108, 6009-6016.

(Continued)

*Primary Examiner* — James J Seidleck
*Assistant Examiner* — S. Camilla Pourbohloul
(74) *Attorney, Agent, or Firm* — Grossman, Tucker et al.

(57) ABSTRACT

The present disclosure relates to a microcapsule and a method of forming a microcapsule which may be used for oxygen sensitive materials. The microcapsule may comprise a shell encapsulating a core material having a surface, wherein the shell comprises a first organic or inorganic polyelectrolyte providing a plurality of cationic or anionic charges. This may then be followed by forming a first layer comprising an inorganic or organic polyelectrolyte on the microcapsule surface, where the polyelectrolyte of the first layer provides a plurality of cationic or anionic charges, opposite to the charge of the shell polyelectrolyte. This may then be followed by forming a second layer comprising a second organic or inorganic polyelectrolyte providing a plurality of cationic or anionic charges, opposite to the charge of the first layer polyelectrolyte.

6 Claims, 11 Drawing Sheets

(56) References Cited

OTHER PUBLICATIONS

Simon-Lukasik, et al., "Erythrosin B phosphorescence as a probe of oxygen diffusion in amorphous gelatin films," Food Hydrocolloids, vol. 18, Issue 4, Jul. 2004, pp. 621-630.

Hirsjarvi, et al., "Layer-by-layer polyelectrolyte coating of low molecular weight poly(lactic acid) nanoparticles," Colloids and Surfaces B: Biointerfaces, vol. 49, Issue 1, Apr. 15, 2006, pp. 93-99.

Shah, et al., "Cubic phase gels as drug delivery systems," Advanced Drug Reviews 47 (2001) 229-250.

Engstrom, "Cubic phases for studies of drug partition into lipid bilayers," European Journal of Pharmaceutical Sciences 8 (1999) 243-254.

Zarif, "Elongated supramolecular assemblies in drug delivery," Journal of Controlled Release 81 (2002) 7-23.

Biodelivery Sciences International, "Bioral Technology," available at http://www.bdsinternational.com/Bioral.php, retrieved on Jul. 20, 2009.

Gaucher, et al., "Block copolymer micelles: preparation, characterization and application in drug delivery," Journal of Controlled Release 109 (2005) 169-188.

Kang, et al., "Stereocomplex Block copolymer micelles: Core-shell Nanostructures with Enhanced Stability," Nano Letters (2005) vol. 5, No. 2, 315-319.

Huo, et al., "A new class of Silica Cross-Linked Micellar Core-Shell Nanoparticles," J Am Chem Soc May 17, 2006; 128(19):6447-53.

Del Valle, "Cyclodextrins and their uses: a review," Process Biochemistry 39 (2004) 1033-1046.

Lee, et al., "Single molecular mechanics of a cholesterol-bearing pullulan nanogel at the hydrophobic interfaces." Biomaterials, 25 (2004) 2911-2918.

Usuki, et al., "Polymer-Clay Nanocomposites," Adv Polym Sci (2005) 179, pp. 135-195.

Mathiowitz, et al., "Polyamide microcapsules for controlled release. I. Characterization of the membranes," Journal of Membrane Science, 40 (1989) 1-26.

Desgouilles, et al., "The design of Nanoparticles Obtained by Solvent Evaporation: A Comprehensive Study," Langmuir 2003, 9504-9510.

Anal, et al., "Ionotropic cross-linked chitosan microspheres for controlled release of ampicillin," International Journal of Pharmaceutics, 312 (2006) 166-173.

Dong, et al., "Poly (D, L-lactide-co-glycolide)/montmorillonite nanoparticles for oral delivery of anticancer drugs," Biomaterials 26 (2005) 6068-6076.

Stefanescu, et al., "Supramolecular Structures in Nanocomposite Multilayered Films," Phys. Chem. Chem. Phys., 2006, 8, 1739-1746.

* cited by examiner

LAYER BY LAYER MODIFICATION OF MICROCAPSULES WITH INORGANIC MATERIALS

FIELD OF THE INVENTION

The present disclosure relates to the modification of microcapsules by layer by layer deposition of polyelectrolytes, including inorganic materials, on microcapsule shells or other barrier materials.

BACKGROUND

Microcapsules may be used as a delivery device for a number of substances. The microcapsules may act as a control release device, allowing for release of a given substance at a desired rate by, for example, degradation of the shell, or upon mechanical impact or application of pressure. The microcapsules may also act as a mechanism to protect certain substances sensitive to, for example, oxygen, moisture, etc. However, some amount of oxygen or moisture migration into the microcapsules may occur, which may lead to chemical changes in the core material.

SUMMARY OF THE INVENTION

An aspect of the present disclosure relates to a method of forming a microcapsule, comprising: forming microcapsules comprising a shell encapsulating a core material having a surface, wherein the shell comprises a first organic polyelectrolyte providing a plurality of cationic or anionic charges. This may then be followed by forming a first layer comprising a first inorganic polyelectrolyte on the microcapsule surface, where the inorganic polyelectrolyte provides a plurality of cationic or anionic charges, opposite to the charge of the first organic polyelectrolyte. This may then be followed by forming a second layer comprising a second organic polyelectrolyte providing a plurality of cationic or anionic charges, opposite to the charge of said inorganic polyelectrolyte.

In another aspect the present disclosure relates to a method of forming a microcapsule, comprising forming microcapsules comprising a shell encapsulating a core material having a surface, wherein the shell comprises a first organic polyelectrolyte providing a plurality of cationic or anionic charges. This may then be followed by forming a first layer comprising a second organic polyelectrolyte on the microcapsule surface, where the second organic polyelectrolyte provides a plurality of cationic or anionic charges, opposite to the charge of the first organic polyelectrolyte. This may then be followed by forming a second layer comprising a first inorganic polyelectrolyte providing a plurality of cationic or anionic charges, opposite to the charge of the second organic polyelectrolyte.

In a further aspect the present disclosure relates to a microcapsule comprising: a shell encapsulating a core material having a surface, wherein the shell comprises a first organic polyelectrolyte providing a plurality of cationic or anionic charges. A first layer may then be disposed on the shell comprising a first inorganic polyelectrolyte where the inorganic polyelectrolyte provides a plurality of cationic or anionic charges, opposite to the charge of the first organic polyelectrolyte. A second layer may then be disposed on the first layer comprising a second organic polyelectrolyte providing a plurality of cationic or anionic charges, opposite to the charge of the first inorganic polyelectrolyte.

In a still further aspect the present disclosure relates to a microcapsule, comprising a shell encapsulating a core material having a surface, wherein the shell comprises a first organic polyelectrolyte providing a plurality of cationic or anionic charges. The may be followed by a first layer disposed on the shell comprising a second organic polyelectrolyte where the second organic polyelectrolyte provides a plurality of cationic or anionic charges, opposite to the charge of the first organic polyelectrolyte. A second layer may then be disposed on the first layer comprising a first inorganic polyelectrolyte providing a plurality of cationic or anionic charges, opposite to the charge of the second organic polyelectrolyte.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure relates to the modification of microcapsules including a sensitive ingredient, such as an oxygen sensitive or moisture sensitive ingredient. Inorganic materials, such as clay, may be utilized to modify the microcapsules using layer by layer deposition of the inorganic material. It may be appreciated that such modification may be extended to barrier materials generally, which may take on forms other than that of microcapsules, such as films.

Sensitive ingredients may degrade upon exposure to a given environment, such as oxygen, moisture or light. Such degradation may alter or reduce desired physical or chemical properties exhibited by the ingredient. Sensitive ingredients may include, for example, pharmaceutical compounds, flavorants, perfumes, colorants, etc. Pharmaceuticals may be understood as herbs, vitamins, or other natural or synthetic chemical substances utilized in the treatment, prevention, cure or diagnosis of disease or to enhance physical or mental well being. In some examples, sensitive ingredients may include oils and/or fatty acids. In one embodiment, the sensitive ingredient may include fish oil including omega-3 fatty acids.

Figure 1:
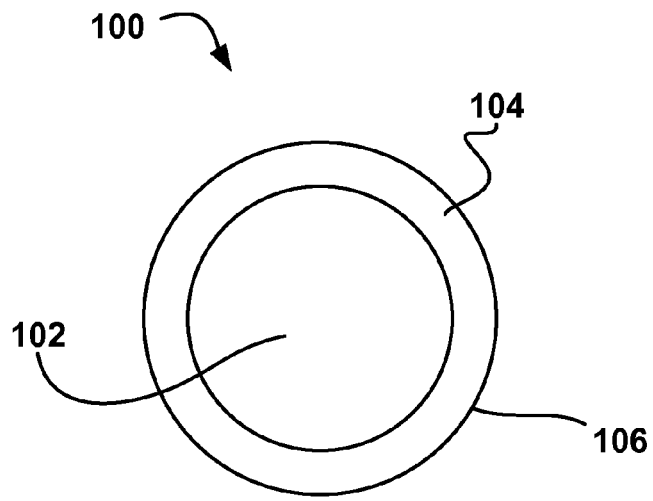
FIG. 1 illustrates an example of a microcapsule.
Figure 2:
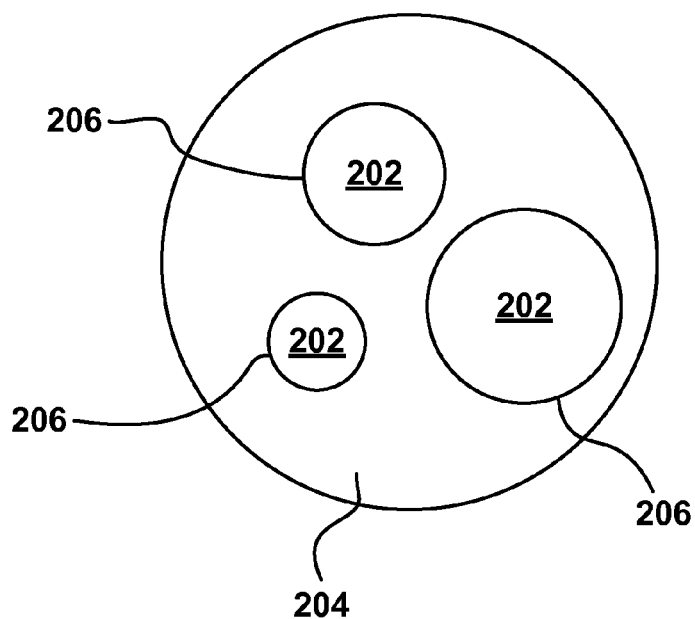
FIG. 2 illustrates another example of a microcapsule.

Microcapsules or other barrier coatings, formed from barrier materials, may aid in preventing the exposure of the sensitive ingredients to given environments or environmental conditions, such as the presence of oxygen or moisture. FIG. 1 illustrates an example of microcapsules 100, which may include a core material 102, including or consisting essentially of a sensitive ingredient, and a shell 104 including a surface 106. The shell may be sourced from an organic polycation or polyanion. In some examples, the microcapsules may have a diameter of 0.01 microns to 1000 microns, including all values and increments therein, and the shell may have a thickness of 0.001 microns to 100 microns, including all values and increments therein. It may be appreciated that in some examples, as illustrated in FIG. 2, the core 202 may be dispersed within the shell material 204 forming domains 206 within the shell matrix.

The microcapsule shell may be formed of a barrier material, such as gelatin, poly(lactic acid), poly(glycolic acid), poly(lactic-co-glycolic acid, lipids including phospholipids, starches, alginate, carrageenan, cellulosics, and other hydrocolloid materials. It may be appreciated that the microcapsules may be formed by various polymerization techniques such as complex coacervation or interfacial polymerization, the formation of micelles or liposomes, spray drying, fluid bed coating, coextrusion, etc. In addition, it may be appreciated that the barrier materials may take on other forms than microcapsules and may be formed or cast into films, sheets or other geometries.

Figure 3:
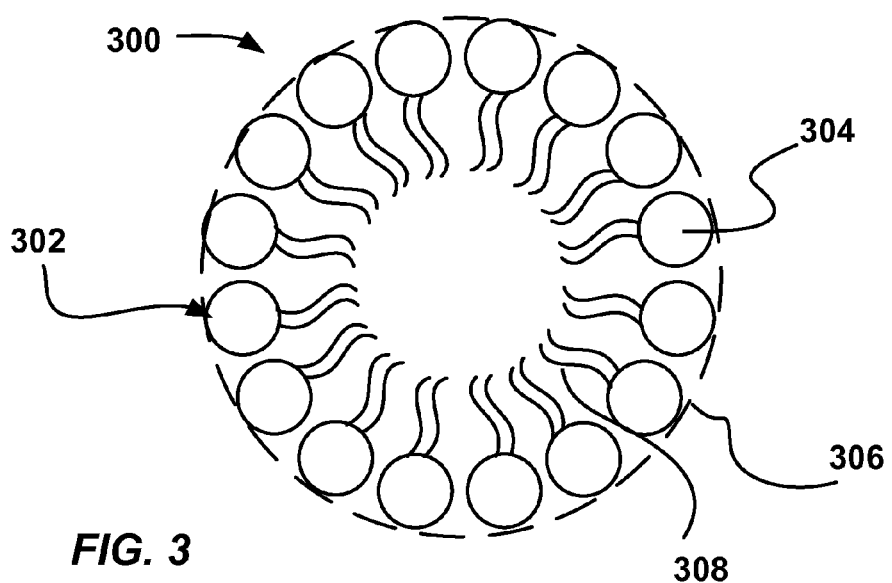
FIG. 3 illustrates an example of a micelle.
Figure 4:
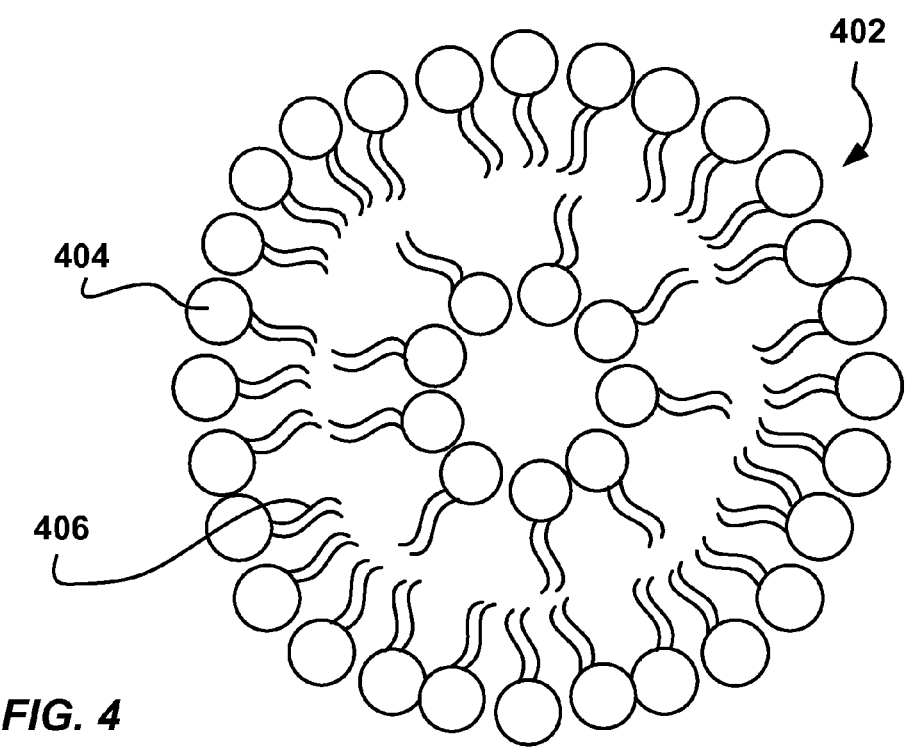
FIG. 4 illustrates an example of a liposome.

Expanding on the above, in some examples, the microcapsules may be formed of amphiphilic lipids, such as phospholipids, including a relatively polar head portion and a relatively non-polar tail portion. The lipids may align forming micelles or liposomes. In micelles, illustrated in FIG. 3, a monolayer of lipids 302 form into a relatively spherical shape. The head portion of the lipids 304 may form the exterior surface 306 (illustrated in dotted line portion) of the micelle 300 and the tail portion of the lipids 308 may point inward. In liposomes, illustrated in FIG. 4, a bi-layer of lipids 402 may be formed. The head portions 404 may form the interior and exterior surfaces of the sphere and the tail portions 406 may face each other between the two layers. The core materials may be incorporated into the above structures during formation or after formation by infusing the structures with the core materials.

In other examples, micelles may be formed of polymeric materials. The polymer materials may include, for example, co-polymers or block polymers. Such block polymers may include di-block polymers or tri-block polymers. Examples of block polymers may include poly(ethylene oxide) and poly(propylene oxide) block copolymers. Similar to lipids, the polymer based micelles may be formed by hydrophobic interaction, electrostatic interaction or metal complexation.

Figure 5:
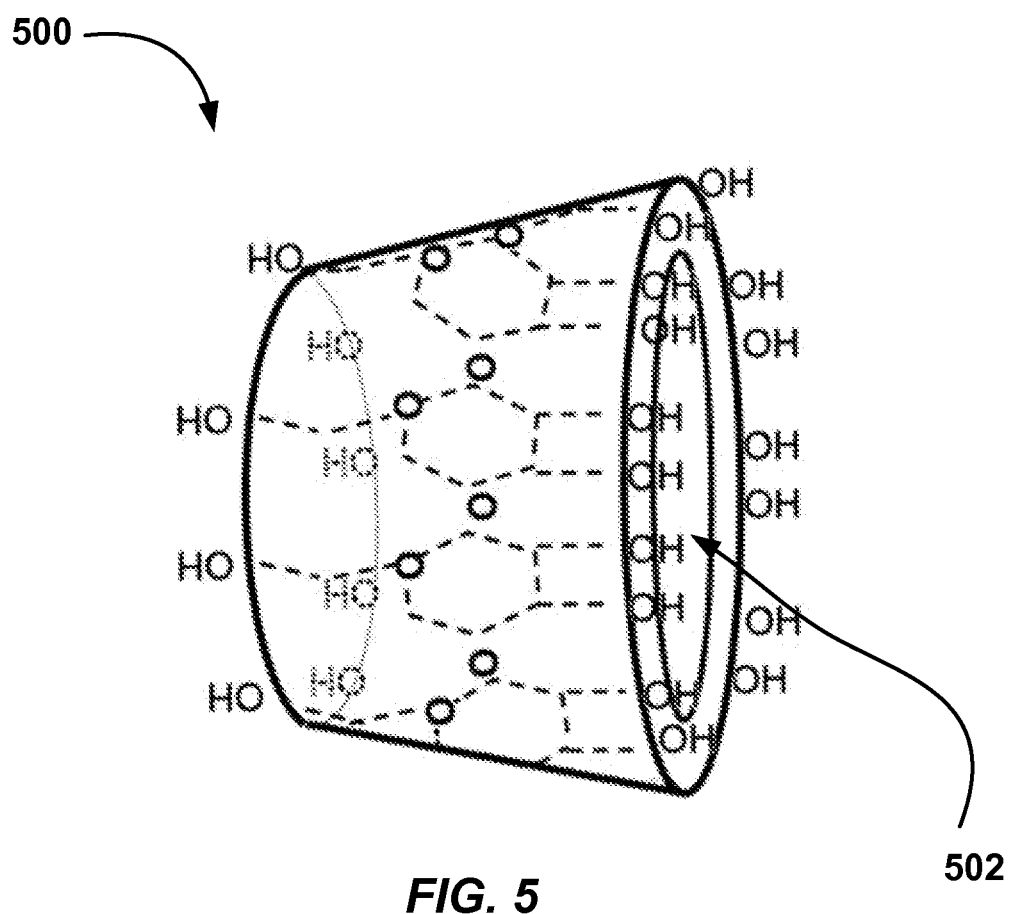
FIG. 5 illustrates an example of a cyclodextrin.

In further examples, cyclodextrins may be used. FIG. 5 illustrates an example of a gamma cyclodextrin 500 forming a ring type or toroidal structure. The interior 502 of the structure may be relatively hydrophobic. The cyclodextrins may be complexed with sensitive ingredients, wherein the hydrophobic portion of the sensitive ingredient, which may be subject to degradation, may be inserted into the hydrophobic interior of the cyclodextrin. The hydrophobic pocket of the cyclodextrin may prevent degradation of the sensitive ingredient. Cyclodextrins may be used in combination with other barrier materials, such as micelles or liposomes.

In yet other examples, coacervation may be used to encapsulate the core material. In complex coacervation, two oppositely charged polymers, polyanions and polycations, may be combined to form the shell composition. Polyanions may include, for example, polyphosphate or gum acacia and polycations may include, for example, gelatin. The two oppositely charged polymers may be dissolved in solution and combined, forming at least three immiscible phases, including a liquid manufacturing phase, a core material phase and a coating material phase. Simple coacervation shell compositions may be formed by a number of vehicles, including changing the temperature of the solution, adding a salt, adding a non-solvent, adding an incompatible polymer to the polymer solution and/or inducing a polymer-polymer interaction.

In further examples, interfacial polymerization may be used to encapsulate the core material. Interfacial polymerization may be understood as the reaction of two reactive components at an interfacial boundary to form a polymer film or shell layer. In some examples of interfacial polymerization, one reactant may be dispersed in an oil phase and a second reactant may be dispersed in an aqueous phase. Reactants, which may be dissolved in an oil phase, may include, for example, isocyanates or acyl chlorides. Reactants, which may be dissolved in an aqueous phase, may include, for example, alcohols or amines. The reactants in the oil and aqueous phases may react at the oil/water interface, forming polymer shells of, for example, polyureas, polyurethanes, polyamides or polyesters, around the oxygen sensitive ingredient, which may be dispersed in either the oil or aqueous phases.

The above barrier materials may be cross-linked or otherwise functionalized. For example, micelles, liposomes or cochleates may be crosslinked by polymerizing the lipids forming the structures, using prepolyermized amphiphiles, using polymerized counterions that may interact with the polar heads of the lipids, the insertion of hydrophobic anchor groups between the lipids, the use of membrane spanning lipids, polycondensation involving the polar head groups, etc. Micelles formed of polymer materials may be stabilized by the crosslinking of the interior core groups or outer shell groups of the polymers using a crosslinking agent or an initiator. In addition, gelatin or alginate shells may be crosslinked using transglutaminase or glutaminase. Such crosslinking or functionalization may increase stability of the barrier materials in solution and/or mechanical properties of the barrier materials removed from solution or incorporated into a product.

In addition, fillers, such as clay, may be incorporated into the barrier materials. The clays may be functionalized with anions or cations, including, for example, alcohols, amines or other functional groups. The functionalized clays may then be attracted to or react with, for example, the various components in the microcapsule shells, such as, for example, gelatin in complex coacervation, isocyanate or acyl chlorides in interfacial polymerization, etc. The clays may exhibit a thickness in the range of 1 nm to 1000 nm, including all values and increments therein, and widths or lengths of 100 nm to 1 micrometer, including all values and increments therein. The aspect ratio (thickness to width or length) of the particles may be in the range of 1 to 10 up to 1 to 1000, including all values and increments therein, such as 1 to 100. Example clays may include, for example, montmorillonite, sodium bentonite, smectite, silicates, etc. Examples of functionalized nanoclays may be available from sources such as Southern Clay Products, Inc. A clay herein may therefore be understood to be a naturally occurring material composed of clay minerals (phyllosilicate minerals), minerals which impart plasticity which may harden when fired, and variable amounts of water.

Figure 6A:
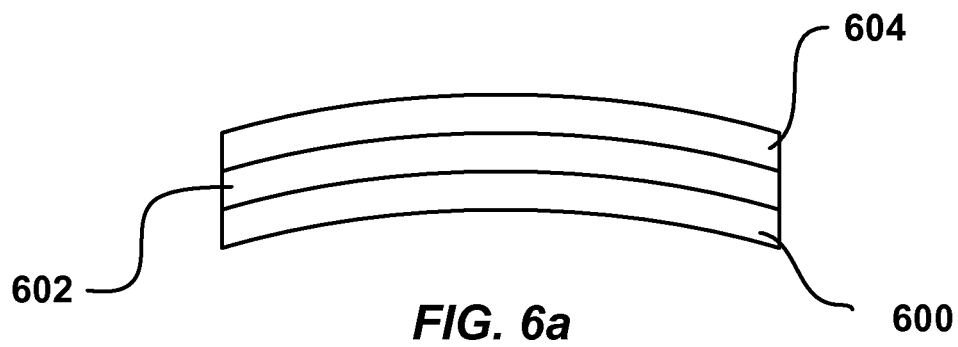
FIG. 6a illustrates an example of a barrier material including polyelectrolyte layers.

Furthermore, as illustrated in the example of FIG. 6a, the shell 600 of the microcapsule may comprise an organic polyelectrolyte comprising either an organic polycation or polyanion. Reference to such polyelectrolyte may be understood as a polymer containing carbon that includes a plurality of ionic charges (cationic or anionic). Then, depending upon the selection of such organic shell polyelectrolyte, one may provide an inorganic (non-carbon containing) polyelectrolyte 602, similarly providing a plurality of cationic or anionic charges. Then, depending upon the selection of such inorganic polyelectrolyte, one may provide a layer 604 of an organic polyelectrolyte, which may again include a plurality of cationic or anionic charges.

One may therefore have alternating layers of inorganic polyelectrolyte and organic polyelectrolyte that range from 2-100 layers, including all values therein, in 1 layer increments. For example, the layer-by-layer process may be repeated to provide a nanocapsule having at least 5 layers which alternate to therefore provide, extending out from the shell, a layer of an inorganic polyelectrolyte, a layer of organic polyelectrolyte, a layer of inorganic polyelectrolyte, a layer of organic polyelectrolyte, and a layer of inorganic polyelectrolyte.

Figure 6B:
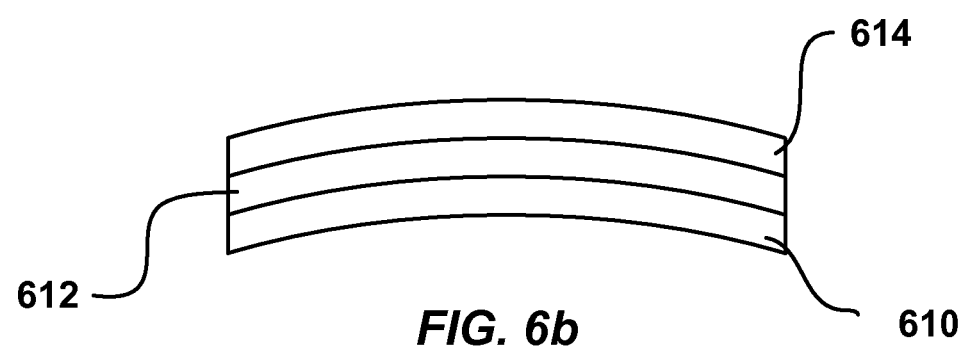
FIG. 6b illustrates an example of a barrier material including polyelectrolyte layers.

In addition, it should be noted that depending again on the selection of the shell polyelectrolyte, one may first, in the layer-by-layer process, deposit on the shell an organic polyelectrolyte, having a charge that is opposite to the charge of the shell polyelectrolyte. This may then be followed by a layer of an inorganic polyelectrolyte, and a layer of organic polyelectrolyte, etc., to again provide alternating layers of such polyelectrolytes in the range from 2-100 layers. For example, illustrated in FIG. 6b, the shell 610 of the nanocapsules may comprise an organic polyelectrolyte comprising either an organic polycation or polyanion. Reference to such polyelectrolyte may be understood as a polymer containing carbon that includes a plurality of ionic charges (cationic or anionic). Then, depending upon the selection of such organic shell polyelectrolyte, one may provide an organic (non-carbon containing) polyelectrolyte 612, similarly providing a plurality of cationic or anionic charges. Then, depending upon the selection of such organic polyelectrolyte, one may provide a layer 614 of an inorganic polyelectrolyte, which may again include a plurality of cationic or anionic charges.

The inorganic polyelectrolyte material may include clays such as silicate clays, gold, silver, and transition metal oxides such as CuO and/or ZnO, and combinations thereof. The inorganic materials may be nanoplatelets having a length or width of 0.1 to 200 microns, including all values therein, in 0.1 micron increments. The inorganic material may also be one that is functionalized with an electrolyte. One example would include gold functionalized with a charged thiol.

The polyelectrolyte layers may be applied to the barrier material by soaking the barrier material in a buffer solution having a pH of less than 7, such as in the range of 2 and 7, including all values and increments therein, such as 4. The buffer solution may include one or more polyelectrolytes therein at a concentration of 1.0% to 90%, including all values and increments therein. Soaking may occur for 10 minutes to 48 hours, including all values and increments therein. Furthermore, between soakings, the barrier film may be washed with a buffer solution having a pH of greater than the pH of the soaking solution, including, for example, a pH in the range of 4 to 9, including all values and increments therein, such as 7.

It may be appreciated that the number, composition and/or order of the layers may be varied. For example, as alluded to above, and in some examples, the polyelectrolyte contacting the barrier surface may be a polyanion and in other examples, the polyelectrolyte contacting the barrier surface may be a polycation. As alluded to above, one or more layers of each polyelectrolyte, i.e., polyanion or polycation, may be applied to the barrier material, including all values and increments in the range of 1 to 40 layers of each polyelectrolyte.

The barrier materials modified herein utilizing layer by layer deposition of polyelectrolytes including inorganic materials now provide standard oxygen transfer rates (OTR) of 5.0 $cm^3\mu m/(m^2*d*kPa)$ or less, including all values in the range of 0.01 $cm^3\mu m/(m^2*d*kPa)$ to 5 $cm^3\mu m/(m^2*d*kPa)$, at 0.1 $cm^3\mu m/(m^2*d*kPa)$ increments. The OTR value is a measure of the oxygen transfer rate within a given volume of permeant ($cm^3$) moving through a specified cross-sectional area of the film ($m^2$) of certain thickness ($\mu m$) over a time (d) with a known pressure force (kPa). The driving force pressure is assumed herein to be 1 atmosphere across the film. Such standard oxygen transfer rates may be similar to those exhibited by barrier materials modified using layer by layer deposition of polyelectrolytes including all organic materials including similar numbers of polyelectrolyte layers. In addition, microcapsules modified using layer by layer deposition of polyelectrolytes including inorganic materials may exhibit relatively less agglomeration during the layer by layer deposition processes, as compared with layer by layer deposition of polyelectrolytes including all organic materials.

EXAMPLES

The examples presented herein are for the purposes of illustration only and are not meant to limit the scope of the disclosure or the claims appended hereto.

Example 1

Films were formed on a 12 inch by 16 inch glass plate using warm solutions of gelatin present at 15% by weight. The gelatin solutions were prepared with both Type A 300 Bloom and Type B 250 Bloom gelatin. Prior to addition of the gelatin solution to the glass plate, the glass plates were treated with a polyalkyl hydrogen siloxane mixture to prevent adhesion of the film to the glass substrate after drying. After treatment with the polyalkyl hydrogen siloxane mixture, the glass plates were chilled prior to casting of the film to accelerate gelling. A Garner knife was used to level the films to a set thickness between 350 μm to 900 μm. A 2.5 inch diameter cookie cutter was used to score 6 to 10 discs per film for future removal of the samples after film drying. A 6 inch diameter cutting ring was used to cut 1 to 3 discs per film. The films were then allowed to dry overnight. Three different methods were used to modify the films including crosslinking, clay-adsorption and LBL development.

Crosslinking was performed on dry film discs. The discs were soaked overnight in a 25% aqueous solution of gluteraldehyde or 5% ethanol solution of gluteraldehyde. The films were then dried in air.

Films were modified with clay using two approaches. The first approach included dispersing the clay into the gelatin solution prior to film casting. Dispersion of the clay consisted of sonication with a 1 $cm^2$ 20 kHz immersion horn at approximately 60 W/$cm^2$ for 10 to 30 minutes. The second method included ionic dispersion, wherein standard gelatin film was prepared and submersed in a pH 4 solution of exfoliated clay for 12 hours. Through ionic interaction and condensation, a clay layer was formed on the surface of the gelatin film. Three clays were investigated including cloisite, kaolin and sodium bentonite.

Two methods were examined for layer by layer deposition of polyelectrolytes onto the gelatin surfaces. The first method included layer by layer development on hydrated gelatin films adhered to a glass substrate. The film and glass substrate were submerged into pH 4 buggered solutions of chitosan and a polyanion (clay or alginate) in an alternating manner with rinse steps between submersions. The second method included the use of dry films of gelatin film held in place by two o-ring brackets that expose both sides of a 100 cm² potion of film. In such a manner, both sides of the film were exposed and treated requiring half the number of treatments to achieve the same number of layers deposited using the gelatin/glass plate method.

National Premium 325 Mesh sodium bentonite clay was supplied by Bentonite Performance Materials, LLC. Closite clay was supplied by Southern Clay. Manucol LB Alginate was supplied by ISP Alginates, Inc. All other chemicals were obtained from Sigma-Aldrich or Fischer Scientific.

Figure 7A:
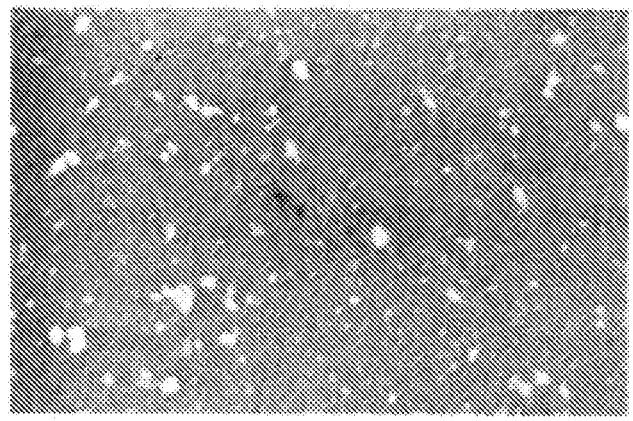
FIG. 7a illustrates a top view of a barrier material.
Figure 7B:
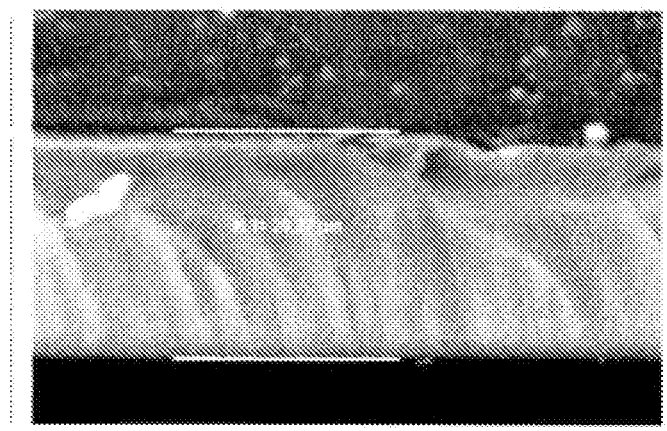
FIG. 7b illustrates a side view of a barrier material.

The dry film thicknesses were measured with a calibrated Mitutoyo Dial Type Thickness Gauge. Film morphology and thickness were qualified with an environmental scanning electron microscope, carried out on a Carl-Zeiss SMT EVO-50EP at 50 Pa of pressure with a variable pressure secondary electron detector or backscatter detector. FIGS. 7a and 7b illustrate ESEM images for film number sample 17 described in Table 1, below.

Oxygen permeability analysis was measured with an Illinois Instruments Model 8000, calibrated with 100 ppm $O_2$ in $N_2$. The film permeability was measured over film areas of 5.07 cm² or 100 cm²; however, data is reported only for the 100 cm² sizes due to lack or reproducibility using the smaller film areas. The oxygen transfer rate (OTR) data was reported in cc/100 in²/day. Raw oxygen transmission data correspond to the final value reported by the instrument after a minimum of 5 hours to allow for system equilibration. The standard OTR data was reported, taking into account film thickness and allowing for comparison to literature. As noted above, the standard OTR data was based on a measure of the oxygen transfer rate with a given volume of permeant (cm³) moving through a specified cross-sectional area of the film (m²) of certain thickness (μm) over a time (d) with a known pressure or driving force, which was assumed to be 1 atmospheres.

The results of the thickness and OTR analysis are presented below in Table 1. For samples 1 through 15 the values are an average of three measurements per disc and 3 to 5 sample discs per film. Once the reproducibility was understood, single measurements were taken for each sample.

TABLE 1

Thickness and OTR Analysis of Various Film Compositions

| Sample | Film | Thickness (μm) | Raw OTR (cm³/m² * d) | Standard OTR cm³ * μm/(m² * d * kPa) | Standard Deviation. |
|---|---|---|---|---|---|
| 1 | Gelatin 300A | 33.9 | 17.20 | 5.75 | 0.22 |
| 2 | Gelatin 275B | 33.0 | 17.10 | 5.57 | 0.03 |
| 3 | Gelatin 300A | 73.7 | 12.40 | 9.01 | 0.74 |
| 4 | Gelatin 275B | 71.1 | 12.37 | 8.68 | 0.50 |
| 5 | Gelatin 300A | 105.8 | 11.13 | 11.63 | 0.33 |
| 6 | Gelatin 275B | 117.1 | 11.13 | 12.93 | 0.51 |
| 7 | Gelatin 300A Crosslinked | 43.2 | 22.00 | 9.38 | 0.73 |
| 8 | Gelatin 275B Crosslinked | 37.3 | 19.40 | 7.13 | 0.06 |
| 9 | Gelatin 300A EtOH | 34.7 | 21.50 | 7.37 | 0.53 |
| 10 | Gelatin 300A 10% Cloisite | 25.40 | 7.02 | 1.76 | 0.11 |
| 11 | Gelatin 275B 10% Cloisite | 33.87 | 7.20 | 2.41 | 0.10 |
| 12 | Gelatin 300A 10% Koalin | 33.87 | 7.24 | 2.42 | 0.08 |
| 13 | Gelatin 300A 1% Koalin | 37.25 | 7.44 | 2.73 | 0.09 |
| 14 | Gelatin 300A 0.5% Koalin | 31.33 | 7.40 | 2.29 | 0.07 |
| 15 | Gelatin 300A 0.1% Koalin | 30.48 | 7.55 | 2.27 | 0.21 |
| 16 | Gelatin 300A 1% Cloisite with sonication | 32.17 | 10.3 | 3.36 | — |
| 17 | Gelatin 300A Cloisite Deposit | 34.71 | 10 | 3.26 | — |
| 18 | Gelatin 300A 1% Bentonite with Sonication and SDS | 27.94 | 6.97 | 1.92 | — |
| 19 | Gelatin 300A 1% Bentonite with Sonication | 27.94 | 6.85 | 1.89 | — |
| 20 | Gelatin 300A 10% Bentonite with Sonication | 35.56 | 5.71 | 2.00 | — |
| 21 | Gelatin 300A Clay Soak | 63.50 | 3.67 | 2.30 | — |

As can be seen from above, the various types of gelatin provided relatively similar performance. The thicker gelatin appeared to provide higher OTR values. Crosslinking of the gelatin alone appeared to produce relatively higher OTR values. However, incorporation of an inorganic material, e.g., clay, into the film, decreased the OTR value by up to 70%. Clay loading was at a level of 0.1% by weight to 10.0% by weight. Clay type is indicated (e.g., Koalin, Closite, Bentonite). In addition, the clay exfoliation method also indicated (e.g. sonication). It appears that clay type and clay exfoliation method has relatively low effects on the observed standard OTR values with respect to the LBL deposition of the polyelectrolytes in combination with a clay material.

Data from layer by layer treated films are presented in Table 2. Gelatin 300 Bloom Type A was used as the standard substrate and the layers were formed of clay or alginate and chitosan. Increasing the number of chitosan/clay layers from 12 total layers to 48 total layers decreased the OTR by 50%, wherein increasing the number of chitosan/alginate layers from 12 total layers to 48 total layers increased the OTR. However, the standard OTR values were well within the range of 0.1 to 5.0 $cm^3 * \mu m/(m^2 * d * kPa)$. It is noted that layer by layer analysis of the crosslinked film was performed under 15% humidity to prevent cracking of the film.

TABLE 2

OTR Analysis of Layer By Layer Modified Films

| Sample | Film | Layers | Standard OTR $cm^3 * \mu m/$ $(m^2 * d * kPa)$ | n | Humidity |
|---|---|---|---|---|---|
| 1 | Chitosan/Clay | 12 | 4.65 | 4 | 0 |
| 2 | Chitosan/Clay | 24 | 3.52 | 2 | 0 |
| 3 | Chitosan/Clay | 48 | 2.26 | 5 | 0 |
| 4 | Chitosan/Alginate | 12 | 2.80 | 2 | 0 |
| 5 | Chitosan/Alginate | 24 | 3.44 | 1 | 0 |
| 6 | Chitosan/Alginate | 48 | 4.95 | 1 | 0 |
| 7 | Chitosan/Alginate | 12 | 3.15 | 2 | 15 |

Figure 8A:
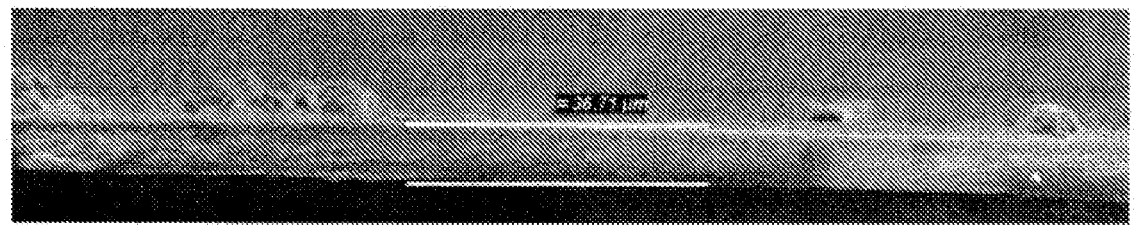
FIG. 8a illustrates a side view of a barrier material including polyelectrolyte layers formed using layer by layer deposition.
Figure 8B:
FIG. 8b illustrates a top view of a barrier material including polyelectrolyte layers formed using layer by layer deposition

FIGS. 8a and 8b illustrates an ESEM images of film sample 3 (from Table 2), which contains 48 total layers of chitosan and clay. As can be seen in FIG. 8a, a number of large clumps of material agglomerated on the surface, which may indicate an uneven coating of LBL film. Similarly, in FIG. 8b, uneven surfaces appear in the mottled white and grey patches on the surface of the film. This image was created with a backscatter detector showing the inorganic material, i.e., clay, as a bright area on the image. Despite lacking to some degree layer by layer uniformity, as can be seen from the above, a relative decrease in OTR was achieved.

Example 2

Figure 9:
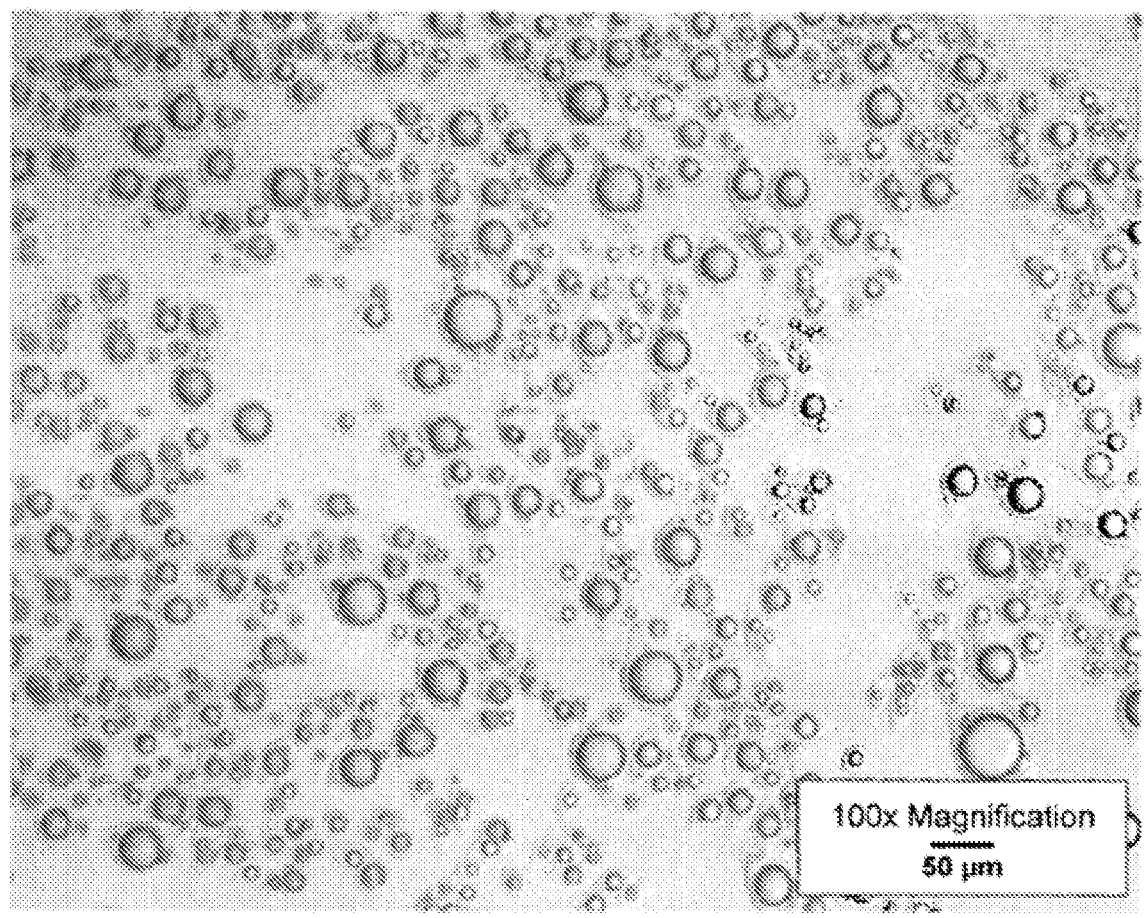
FIG. 9 illustrates an image of microcapsules.

Microcapsules, encapsulating canola oil, were prepared using a complex coacervation process to form a gelatin (Type A, 300 Bloom) shell around an emulsified canola oil droplet. The canola oil droplet included up to 20 ppm of the oxygen sensitive fluorescent dye, tris(4,7-diphenyl-1,10-phenanthroline)ruthenium(II)bis(hexafluorophosphate) complex and up to 20 ppm of an inert fluorescent standard. To form the capsules 10 grams of 300 Bloom Type A gelatin was dissolved in 400 mL of deionized water at 60° C. 40 mL of core material was homogenized into the gelatin solution to form droplets of less than 100 μm in diameter. 20 ml of 5% sodium hexametaphosphate solution, CALGON, was added to core material solution, followed by lowering the pH to approximately 4.8 with 10% acetic acid. The reaction mixture was then cooled to room temperature, followed by post-treatment (e.g., crosslinking, clay soaking, or LBL). The capsules were then allowed to settle, separated from the supernatant, and washed three time with fresh deionized water. The steps were carried out under inert gas ($N_2$ or Ar) to minimize oxidation of the $O_2$ sensitive dye. The microcapsules formed had an average diameter of approximately 30 μm. FIG. 9 presents an image taken by optical microscopy confirming the size and core-shell morphology. In some examples, the shells were also prepared via fish gelatin.

Microcapsules with a poly(urea-formaldehyde) shell were prepared, encapsulating canola oil including 20 ppm of the oxygen sensitive fluorescent dye and 20 ppm inert fluorescent standard described above. 50 mL of a 10% EMA solution was mixed with 2.5 grams of urea and 0.25 grams of resorcinol at room temperature. Approximately 30 mL of ultra pure water was added to the mixture. The pH was raised to 3.7 with a concentrated solution of NaOH. In addition 25 grams of core material was emulsified into the aqueous solution and 6.7 mL of 37% formaldehyde was then added. The system was heated to 60° C. for at least two hours. Once the mixture was cooled, the microcapsules were isolated for testing. All solutions were purged and reacted under inert conditions.

The gelatin capsules formed by complex coacervation were post treated by crosslinking, clay soaking and the formation of alternating layers of polyelectrolytes.

More specifically, 50 grams of gelatin microcapsules were crosslinked with 5 mL of 25% gluteraldehyde solution. Crosslinking was performed for 4 to 12 hours and the amount of gluteraldehyde added to the capsule batch was adjusted to control crosslinking density. Another 50 grams of gelatin microcapsules were crosslinked by soaking in transglutaminase present at 0.1% by weight overnight.

Post treatment by clay soaking was performed by soaking gelatin microcapsules in a solution of exfoliated clay for 12 hours.

Post treatment by layer by layer formation was performed by depositing alternating layers of chitosan and clay or alginate on the microcapsules using the following procedure, wherein a dispersion of the capsules were centrifuged and the supernatant was decanted. The capsules were then washed by dispersing the capsules into a pH 7 buffer, centrifuging the capsules and decanting the supernatant. A first layer of alginate or clay was then applied to the capsules by dispersing the capsules into a pH 4 buffer containing the alginate or clay. The capsules were centrifuged and the supernatant was decanted. The capsules were again washed by dispersing into a pH 7 buffer, centrifuging and decanting the supernatant. A second layer of chitosan was applied to the capsules by dispersing the capsules into a pH buffer containing chitosan. The capsules were centrifuged and the supernatant was decanted. The capsules were again washed by dispersing into a pH 7 buffer, centrifuging and decanting the supernatant. For each additional layer of chitosan and alginate or clay, the processes of washing, applying the first layer, washing, applying the second layer and washing were performed.

Table 3 summarizes a list of various microcapsule formulations including post-treatments that were performed. The core oxidation rates of the dry microcapsules of these formulations were analyzed, wherein 50 mL of capsule slurries were centrifuged at 3200 rpm for 10 minutes. The precipitate microcapsule paste was loaded into individual wells of a 96-well plate. The plate and capsules were dried in a vacuum oven overnight at 40° C., followed by fluorescence kinetic measurements. Fluorescence spectra of the core materials were collected with a Perkin Elmer LS50B Luminescence Spectrometer. Fluorescence of the microcapsule samples was monitored with a Beckman Coulter DTX 880 Multimode Detector. Microcapsule samples were excited at 485 nm and measurements were made at 535 nm and 625 nm. A ratio of the two signals was used to quantify core oxidation.

TABLE 3

Various Microcapsule Formulations and Post Treatments

| Sample Number | Shell | Cross-linking | Shell Treatment |
|---|---|---|---|
| 1 | 300 Bloom Type A Gelatin | None | None |
| 2 | 300 Bloom Type A Gelatin | Gluteraldehyde | None |
| 2a | 300 Bloom Type A Gelatin | Gluteraldehyde - minimal amount used to provide crosslinking | None |
| 3 | 300 Bloom Type A Gelatin | Transglutaminase | None |
| 4 | Urea-Formaldehyde | None | None |
| 5 | Fish Gelatin | Transglutaminase | None |
| 6 | 300 Bloom Type A Gelatin | None | Microcapsules were soaked in a solution of exfoliated kaolin clay |
| 7 | 300 Bloom Type A Gelatin | None | Microcapsules were soaked in a solution of exfoliated sodium bentonite clay |
| 8 | 300 Bloom Type A Gelatin | Transglutaminase | Microcapsules were soaked in a solution of exfoliated kaolin clay before crosslinking |
| 9 | 300 Bloom Type A Gelatin | Transglutaminase | Microcapsules were soaked in a solution of exfoliated sodium bentonite clay before crosslinking |
| 10 | 300 Bloom Type A Gelatin | Transglutaminase | LBL formation was used to deposit a layer of clay and a layer of chitosan after crosslinking |
| 11 | 300 Bloom Type A Gelatin | Transglutaminase | LBL formation was used to deposit two layers of clay and a layer of chitosan in between after crosslinking |
| 12 | 300 Bloom Type A Gelatin | None | LBL formation was used to deposit 5 layers of alternating bentonite clay and chitosan |
| 13 | 300 Bloom Type A Gelatin | None | LBL formation was used to deposit 5 layers of alternating bentonite clay and chitosan, with additional soak time between the layers |
| 14 | 300 Bloom Type A Gelatin | None | LBL formation was used to deposit ten alternating layers of clay and chitosan |
| 15 | 300 Bloom Type A Gelatin | Transglutaminase | LBL formation was used to deposit five alternating layers of clay and chitosan after crosslinking |
| 16 | 300 Bloom Type A Gelatin | Transglutaminase | LBL formation was used to deposit five alternating layers of clay and chitosan with additional soak time in between the layers after crosslinking |
| 17 | 300 Bloom Type A Gelatin | Transglutaminase | LBL formation was used to deposit ten alternating layers of clay and chitosan after crosslinking |
| 18 | 300 Bloom Type A Gelatin | Transglutaminase | First the microcapsules were soaked in bentonite and then LBL formation was used to deposit ten alternating layers of clay and chitosan before crosslinking |
| 19 | 300 Bloom Type A Gelatin | Transglutaminase | First the microcapsules were soaked in kaolin and then LBL formation was used to deposit ten alternating layers of clay and chitosan before crosslinking |
| 21 | 300 Bloom Type A Gelatin | Transglutaminase | First the microcapsules were soaked in kaolin, crosslinked and then LBL formation was used to deposit five alternating layers of clay and chitosan |

TABLE 3-continued

Various Microcapsule Formulations and Post Treatments

| Sample Number | Shell | Cross-linking | Shell Treatment |
|---|---|---|---|
| 22 | 300 Bloom Type A Gelatin | Transglutaminase | First the microcapsules were soaked in bentonite, crosslinked and then LBL formation was used to deposit five alternating layers of clay and chitosan |

Figure 10:
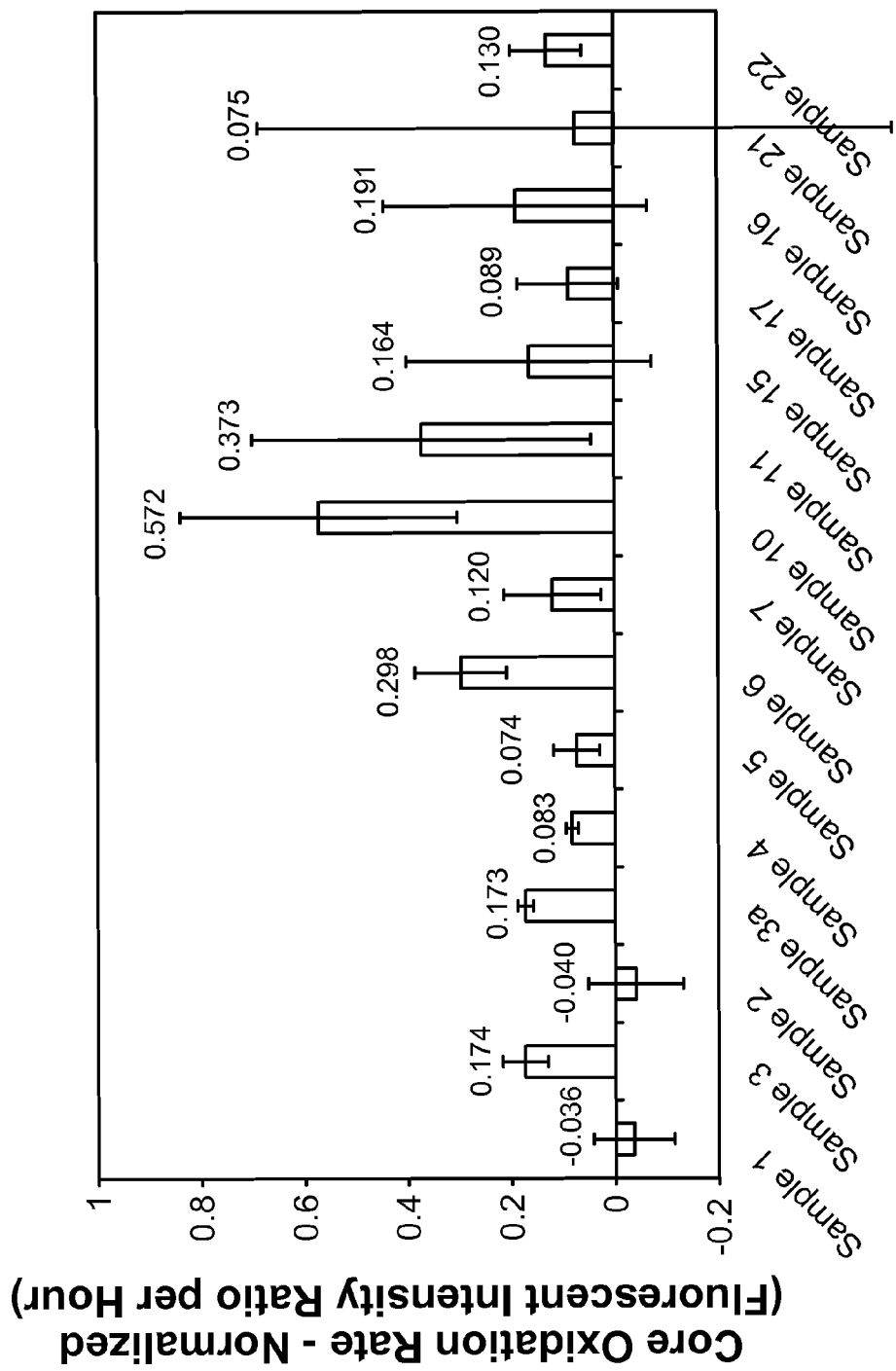
FIG. 10 illustrates core oxidation rate for various post treated microcapsules.

FIG. 10 illustrates the normalized average results of oxygen barrier testing of the dry microcapsules in Table 3 by measuring the fluorescent intensity of the microcapsules to determine the core oxidation rate. For each formulation, three samples were tested twice for 12 hours at 40° C. resulting in six datasets. The normalized core oxidation was therefore determined by placement of an $O_2$ sensitive fluorescent dye within the nanocapsule and monitoring the fluorescence of such dye relative to a non-sensitive fluorescent dye also contained in the nanocapsule. Sample 3 corresponds to the use of gelatin and transglutaminase as a crosslinking agent, without any shell treatment, may therefore set the control baseline for evaluation of oxidation, indicating a value of 0.174. As can be seen, sample 15, which similarly employed gelatin in combination with transglutaminase, along with the use of LBL coating depositing five (5) alternating layer on the shell after crosslinking, indicated a relatively lower value and therefore lower relative $O_2$ permeability. Similar comments apply to Sample 17, which again employed gelatin in combination with tranglutaminase, along with the use of LBL coating depositing 10 alternating layers of clay and chitosan.

As can be seen in this figure the non-crosslinked microcapsules (samples 1, 4, 6 and 7) performed relatively well, exhibiting relatively low core oxidation rates. However, such non-crosslinked gelatin capsules typically exhibit relatively rapid swelling and dissolution in moist environments.

Microcapsules crosslinked with transglutaminase (sample 3) and lightly crosslinked with gluteraldehyde (sample 2a) resulted in some increase in the oxygen permeability. However, it is noted that microcapsules crosslinked with gluteraldehyde that were relatively heavier crosslinked resulted in negative oxidation rates, which may be due to measurement (fluorescence) interference created by the shell. In addition, fish gelatin crosslinked with transglutaminase (sample 5) and urea formaldehyde (UF) shells (sample 4) resulted in similar oxygen barrier properties being less than that of crosslinked gelatin.

In addition, as can be seen in FIG. 10 soaking the microcapsules in kaolin clay (sample 6) resulted in greater core oxidation rates, whereas soaking the microcapsules in bentonite (sample 7) resulted in relatively lower core oxidation rates. Layer by layer additions of clay and chitosan resulted in relatively higher core oxidation rates for relatively low numbers of layers (samples 10 and 11) but increased layer by layer additions of five or greater (samples 15-17) resulted in relatively lower core oxidation rates. In fact, the oxidation rates of microcapsules including five or more layer by layer additions (samples 15-17) were somewhat comparable to the crosslinked gelatin microcapsules, the urea formaldehyde microcapsules and the crosslinked fish gelatin microcapsules. Accordingly, there has been established herein a decrease in oxygen permeability with increasing layers in a LBL deposition process by incorporating an inorganic material (clay) for increased barrier performance.

Further examination was performed on the microcapsules modified by layer by layer additions, which may be relatively sensitive to several factors including polyelectrolyte concentration, polymer molecular weight, charge density and pH. Polyelectrolyte concentration was tuned and samples of the tested concentrations of the polyelectrolytes are listed in Table 4. Many of the tested formulations resulted in some agglomeration of the microcapsules during the coating process. The alginate/chitosan systems were found to be relatively more susceptible to agglomeration, while the clay/chitosan systems were found to show relatively little agglomeration, comparatively.

TABLE 4

Concentrations of Polyelectrolytes

| Layer Compositions | Layer Soln. Conc. | Capsule Conc. (mg/ml) | Layers | Observations |
|---|---|---|---|---|
| Alginate/Chitosan | 0.25% | 50 | 4 | Aggregation after a third layer |
| Alginate/Chitosan | 0.10% | 12.5 | 3 | Aggregation after a second layer |
| Alginate/Chitosan | 0.10% | 25 | 5 | Aggregation after chitosan layers (sonicated) |
| Alginate/Chitosan | 0.05% | 25 | 4 | Aggregation |
| Alginate/Chitosan | 0.10% | 16.7 | 4 | Smaller agglomerates formed with third and fourth layers, improved zeta potentials |
| Alginate/Chitosan | 0.10% | 12.5 | 4 | Doubled quantity, reduced agglomerations, improved zeta potentials |
| Clay/Chitosan | 0.25%/0.1% | 16.7 | 6 | Agglomerates did not form |

Figure 11A:
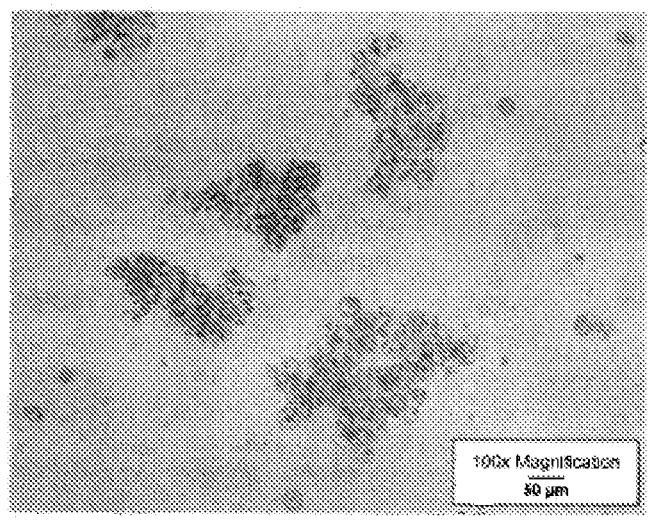
FIG. 11a illustrates agglomeration of microcapsules including all organic polyelectrolytes.
Figure 11B:
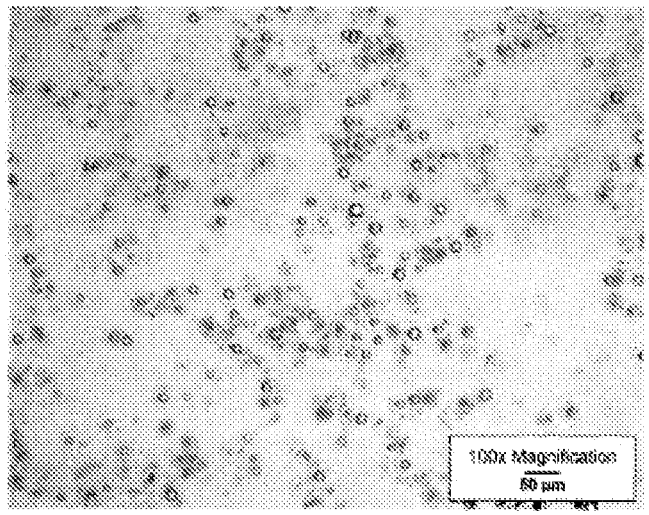
FIG. 11b illustrates the dispersion of microcapsules including inorganic polyelectrolytes.

FIGS. 11a and 11b include optical micrograph images of the gelatin microcapsules with five total layers of chitosan/alginate (FIG. 11a) and six total layers of chitosan/clay (FIG. 11b). As can be seen in the figures, the clay covered microcapsules remain somewhat dispersed in solution. In these examples, sonication (i.e., an ultrasonic bath) was used after each coating step to aid in the redispersement of the microcapsules.

Figure 12A:
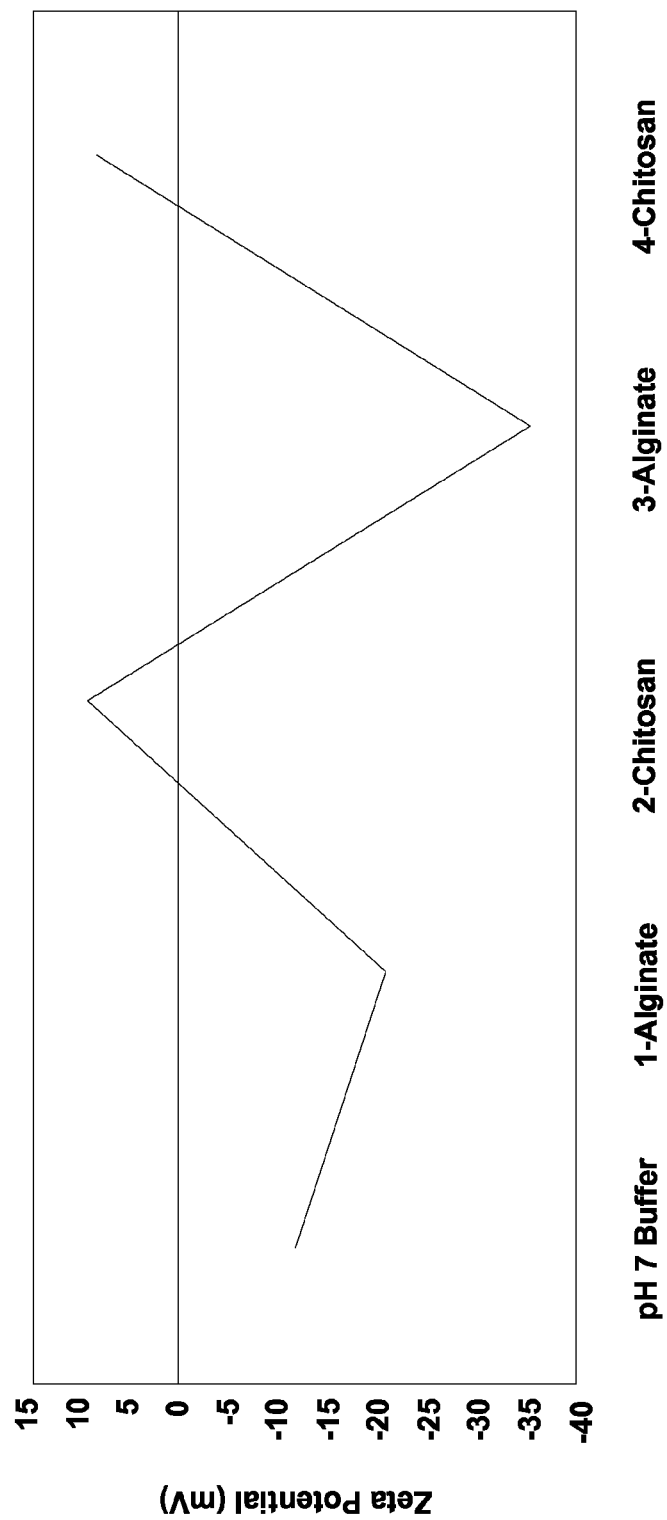
FIG. 12a illustrates the zeta potential upon applying organic polyelectrolyte layers.
Figure 12B:
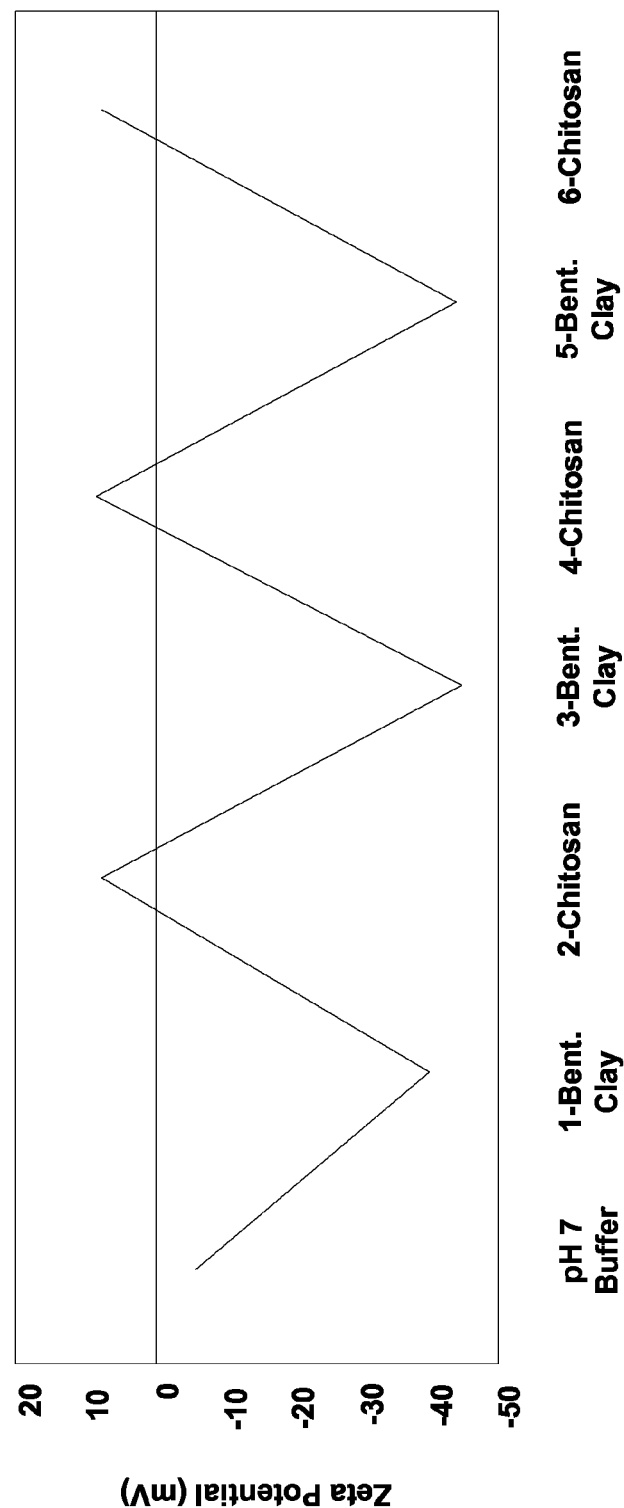
FIG. 12b illustrates the zeta potential upon applying polyelectrolyte layers including inorganic polyelectrolytes.

Zeta potential analysis was then utilized to monitor the microcapsule surface charge during layer by layer development. FIGS. 12a and 12b illustrates the zeta potential analysis for capsules coated in chitosan/alginate (FIG. 12a) and chitosan/clay layers (FIG. 12b). Application of alginate or clay results in negative surface charge and zeta potential measurement, wherein application of chitosan resulted in a positive surface charge and zeta potential measurement.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A microcapsule, comprising:
    (a) a shell encapsulating a core material having a surface, wherein said shell comprises a first organic polyelectrolyte providing a plurality of cationic or anionic charges including crosslinked gelatin and a clay filler, wherein said clay filler is functionalized with functional groups including alcohol or amine functional groups that are attracted to or react with said gelatin and said clay filler has a thickness in the range of 1 nm to 1000 nm, a width or length in the range of 100 nm to 1 micrometer and an aspect ratio in the range of 1 to 10 up to 1 to 1,000;
    (b) a first layer disposed on said shell comprising a first inorganic polyelectrolyte where said inorganic polyelectrolyte provides a plurality of cationic or anionic charges, opposite to the charge of said first organic polyelectrolyte, wherein said first inorganic polyelectrolyte is an inorganic material comprising clay functionalized with an electrolyte wherein said functionalized clay is in the form of nanoplatelets having a length or width of 0.1 to 200 microns;
    (c) a second layer disposed on the first layer comprising a second organic polyelectrolyte comprising chitosan providing a plurality of cationic or anionic charges, opposite to said charge of said first inorganic polyelectrolyte wherein the standard oxygen transfer rate is 5.0 cm$^3$ μm/(m$^2$*d*kPa) or less with a driving force pressure of 1 atmosphere wherein steps (b) and (c) are repeated to provide at least five alternating polyelectrolyte layers.

2. The microcapsule of claim 1 wherein (b) and/or (c) are repeated and said nanocapsule comprises at least 3-100 alternating polyelectrolyte layers.

3. The microcapsule of claim 1 wherein said microcapsules have a diameter of 0.01 microns to 1000 microns.

4. The microcapsule of claim 1 wherein said shell has a thickness of 0.001 microns to 100 microns.

5. The microcapsule of claim 1 wherein said inorganic polyelectrolyte layer has a thickness of 1.0 nm to 1000 nm.

6. The microcapsule of claim 1 wherein said organic polyelectrolyte layer has a thickness of 0.1 nm to 1000 nm.

* * * * *